Jan. 11, 1966  R. J. GROSS  3,228,637
ROTA-VANE PARACHUTE
Filed April 23, 1964  4 Sheets-Sheet 1

INVENTOR.
REINHOLD J. GROSS
BY
Charles H. Wagner
ATTORNEYS

Jan. 11, 1966   R. J. GROSS   3,228,637
ROTA-VANE PARACHUTE
Filed April 23, 1964   4 Sheets-Sheet 2
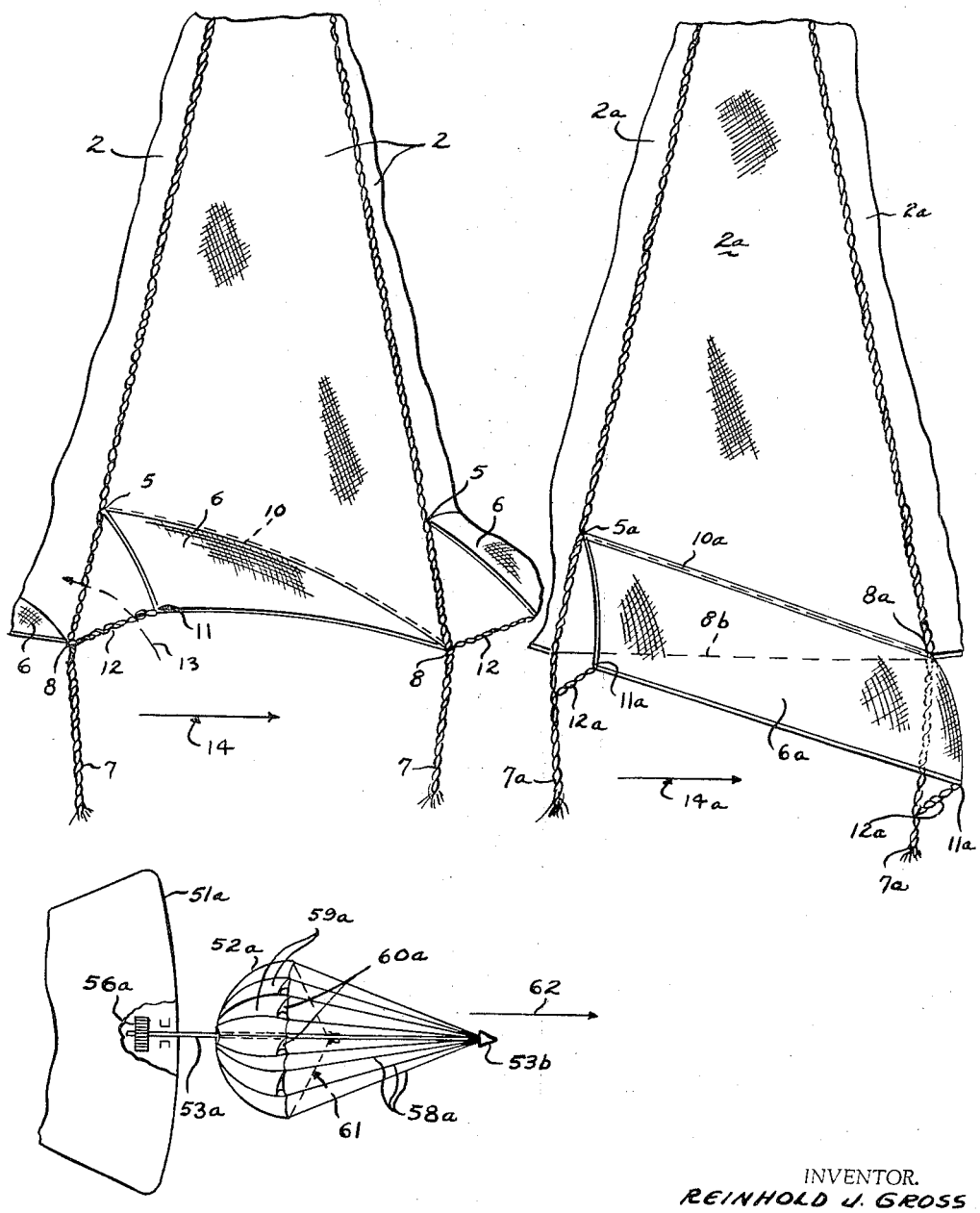
INVENTOR.
REINHOLD J. GROSS
BY
ATTORNEYS Jan. 11, 1966   R. J. GROSS   3,228,637
ROTA-VANE PARACHUTE
Filed April 23, 1964   4 Sheets-Sheet 3

INVENTOR.
REINHOLD J. GROSS
BY
ATTORNEYS

Jan. 11, 1966  R. J. GROSS  3,228,637
ROTA-VANE PARACHUTE
Filed April 23, 1964  4 Sheets-Sheet 4

INVENTOR.
REINHOLD J. GROSS
BY
ATTORNEYS

United States Patent Office 3,228,637
Patented Jan. 11, 1966

3,228,637
ROTA-VANE PARACHUTE
Reinhold J. Gross, Dayton, Ohio, assignor to the United States of America as represented by the Secretary of the Air Force
Filed Apr. 23, 1964, Ser. No. 362,209
1 Claim. (Cl. 244—152)
(Granted under Title 35, U.S. Code (1952), sec. 266)

The invention described herein may be manufactured and used by or for the United States Government for governmental purposes without payment to me of any royalty thereon.

This invention relates generally to parachutes, and more particularly to parachutes which are rotatable or rotate during the descent thereof, having for an object the provision of a parachute which is simple to fabricate and can also be fabricated easily from conventional parachutes to provide improved stability and better drag characteristics.

A further object is the provision of a parachute having means for producing a quick opening thereof, compared with conventional parachutes, in which the quick opening means constitutes means for rotating the chute on its descent axis to afford improved stability and increased drag.

A further object is the provision of a parachute having rotational characteristics in conjunction with a support therefor, and utilizing the rotational characteristics of the chute relative to the support to generate power.

A further object is the provision of ap arachute having air deflecting means around the skirt thereof for selectively rotating the chute either clockwise or counter-clockwise about its descent axis.

A further object is the provision of a parachute having a plurality of inclined flaps spaced equally around the skirt portion and facing circumferentially in the same direction for deflecting the air circumferentially in the opposite direction during descent to provide rotational force for the parachute during the descent thereof.

A further object is the provision of a parachute having a plurality of segmental gores or panels secured together along their radial edges to form a flat circular canopy in which the outer end portions of the gores or panels are not connected together, and the shroud lines are connected to the ends of the panels at one side, and connected in inwardly spaced relation to the ends at the opposite side to provide inclined triangular air deflecting flaps at the outer ends of the panels, and the provision of a flexible tie connector between free or apex end of each of the flaps and the shroud line which is connected side of the adjacent panel for limiting outward deflection of the inclined flaps by the air stream.

Other objects and advantages of the invention will become apparent from the following description and accompanying drawings in which like reference characters refer to like parts in the several figures.

FIG. 2 is an enlarged fragmentary plan view in elevation, primarily of one panel or gore, of a conventional flat circular parachute and parts of the adjacent gores showing the same modified to incorporate the invention therein.

FIG. 3 is a similar view showing a single gore within a rotational flap added to the skirt portion thereof to effect auto-rotation of the canopy during its descent.

FIGS. 8 and 9 are fragmentary schematic elevational views showing applications of parachutes incorporating the invention for generating power, for instance in connection with a missile or space vehicle in the process of reentry.

Figure 1:
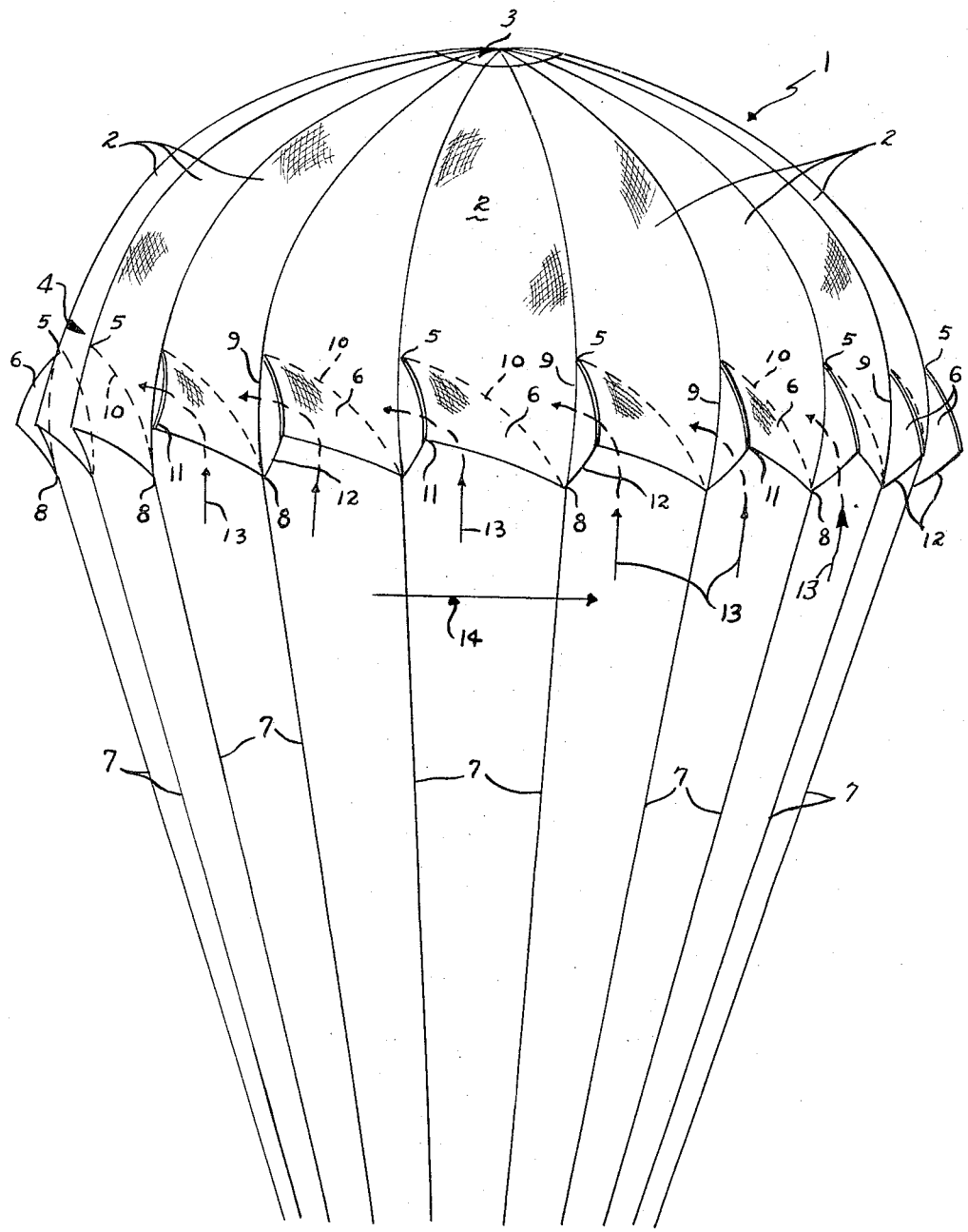
FIG. 1 is a side elevation of a parachute illustrating one form of the invention with the lower ends of the shroud lines broken away or omitted.

Referrng to FIG. 1, the reference numeral 1 denotes a flat circular canopy having a plurality of radial gores or panels 2, an apex vent 3, and an annular skirt portion 4, incorporating the invention.

The panels or gores 2 are not connected directly to each other in the lower portion of the skirt, for instance below the points 5, so as to leave inclined air deflecting flaps 6 which are deflected outwardly during descent after deployment.

The reference numerals 7 indicate shroud or suspension lines which are connected to the canopy at the points 5, and at the points 8 to one and the same side of each of the lower ends of the panels as shown, the radial edge portions 9 at the same side of each panel being connected to one shroud line 7, thus providing the triangular shape flaps outlined by the dotted lines 10, all disposed with the free ends or apexes 11 extending circumferentially in the same direction.

The apex corner 11 of each of the inclined triangular air deflectors or rotational flaps 6 is connected or tied to a shroud line 7 by a short tie-cord or connector 12, thus permitting the triangular flaps 6 to be deflected outwardly, only to a predetermined extent, whereby the air stream, indicated by the arrows 13, is deflected circumferentially to cause a reaction on the skirt or periphery 4 of the canopy for causing rotation thereof during descent, in the direction of the arrow 14.

The flap 6 being free for limited outward deflection by the connector cords 12 into the air stream also provides means for producing a faster opening or deployment of the canopy, also the rapid rotation of the canopy by the deflected air stream tends to spread the canopy to a greater diameter and thus increase the drag, reducing the rate of descent. Also the flaps and air stream deflected thereby and rotation of the canopy increases the stability of the canopy to a point where oscillation during descent is practically eliminated.

Where it is desired to reduce or eliminate rotation of a suspended load connected to the lower ends of the shroud lines 7 an anti-friction or ball bearing swivel may be interposed in the shroud line connection to the load.

FIG. 2 is an enlarged fragmentary view showing a portion of one of the panels laid out flat with the rotation flap 6 thereof inclined outwardly to show the arrangement of the invention a little better than the disclosure in FIG. 1.

In FIG. 3 one of the rotation initiating flaps indicated at 6a is shown sewed or otherwise fastened to the exterior of one of the gores 2a along the inclined line 10a, between the points 5a and 8a. In this form the panels 2a are secured together along the adjacent edges from the apex vent to the lower edge 8b of the skirt, and the flap 6a is also inclined and located on the outside of the panel. However, the right hand end of the flap 6a as shown in this figure extends materially below the lower edge 8b of the skirt. The flap in this form is substantially rectangular and is tied at both of its lower or free opposite ends 11a to the shroud lines 7a by the flexible connecting cord members 12a to limit outward displacement of the flaps.

When the chute 1a is deployed the air stream deflects the flaps 6a outwardly to accelerate the deployment while the inclined relation of the flaps 6a in the slip stream causes rotation of the canopy with the advantages of increased drag and excellent stability as previously indicated.

Figure 4:
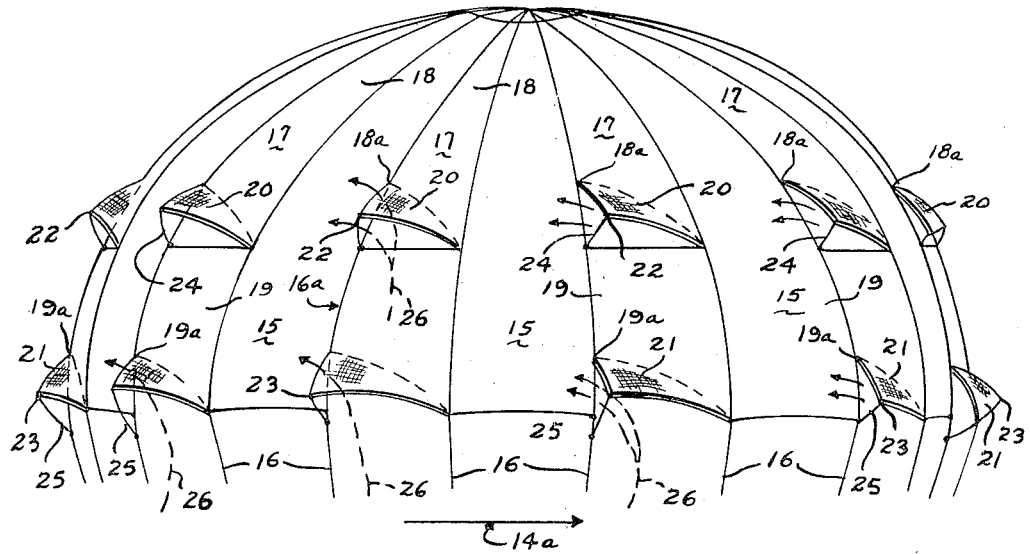
FIG. 4 illustrates a side elevation of a further modification of an inflated canopy in which alternate gores are modified to provide inclined auto-rotation flaps at the base of the skirt portion, and the provision of additional air deflecting flaps forming openings between the skirt and the apex for increasing the rate of auto-rotation of the canopy during descent.

In the modification shown in FIG. 4 the rotation inducing flaps are fabricated in alternate panels, between solid fabric panels. The construction of the flaps is substantially the same as shown in FIGS. 1 and 2 except that the alternate panels may be provided with two (or more) rotational flaps. The solid gores are indicated at 15, connected at their lower end by the shroud lines 16, while the alternate gores are denoted by the reference numerals 17, each including two (or more) panel sections 18 and 19.

As shown, the lower left hand ends of the panel sections 18 and 19 are not secured directly to the panels 15 between the outer ends thereof and the points 18a and 19a, thus providing triangular inclined air deflecting flaps 20 and 21, all inclining upwardly and circumferentially in the same direction. The free or apex ends 22 and 23 respectively of the flaps 20 and 21 are connected at predetermined distances below the respective flaps to the seams 16a, or the shroud lines 16, by flexible connectors or tie lines 24 and 25, thus limiting the amount of outward deflection of the inclined flaps 20 and 21 by the slip stream. Air passing through the openings, as indicated by the arrows 26, is deflected circumferentially in the same direction, thus rotating the parachute about its descent axis in the opposite direction, indicated by the arrow 14a.

While these rotational flaps or rota-vanes (6 in FIG. 1, or 6a in FIG. 3, or 20 and 21 in FIG. 4) are shown in connection with solid radial gore flat circular parachutes, it is contemplated that they are useable with or incorporated in ring-slot or ribbon parachutes or on any non-rotating canopy.

Figure 5:
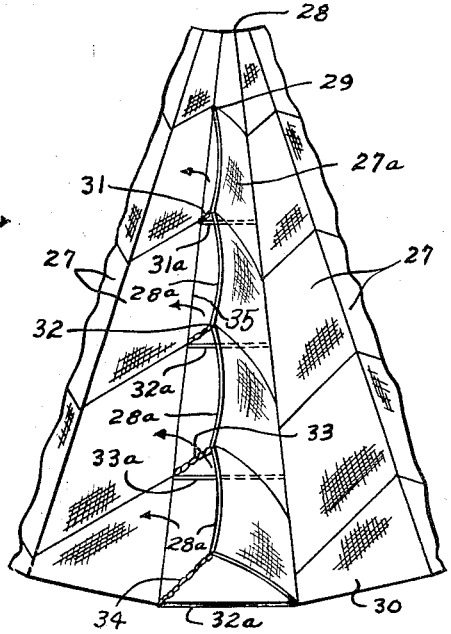
FIG. 5 is a fragmentary plan view of a further modification in which certain of the radial gores in the canopy are vented for a major portion of their length along one edge thereof to provide outwardly inclined air deflectors for producing the auto-rotation of the canopy.

FIG. 5 discloses a further modification of a rotatable or rota-vane parachute in which the conventional panels or segments forming the flat circular canopy are indicated at 27. A substantial length of certain of the intermediate panels 27a which are substantially evenly spaced around the vent opening 28 are not directly secured throughout their length at one edge 28a to the edge 35 of the adjacent panel 27 to thus provide a long air deflection panel-like flap, extending between spaced panels 27 from a point indicated generally at 29 at the top, to the outer edge of the skirt portion 30. These long deflection flaps or panels 27a are connected or tied to the edges 35 of the adjacent panels 27 by a plurality of radially spaced tie connections or tapes 31, 32, 33 and 34. It may be desirable, at the points where the tie tapes 31 to 34 are connected to the edge 35 of the adjacent panel 27, to secure the edge 35 to the adjacent edge of the next spaced panel 27 to which the back edge of the flap is connected. Tie-tapes for this purpose are indicated at 31a, 32a, 33a and 34a.

When the completed canopy shown in FIG. 5 is deployed, the slip stream deflects the elongated flap 27a upwardly and outwardly to the inclined relation desired, as determined by the lengths of the tie-tapes 31 to 34, thus deflecting the air laterally to cause rapid rotation of the canopy in the opposite direction during descent.

Figure 6:
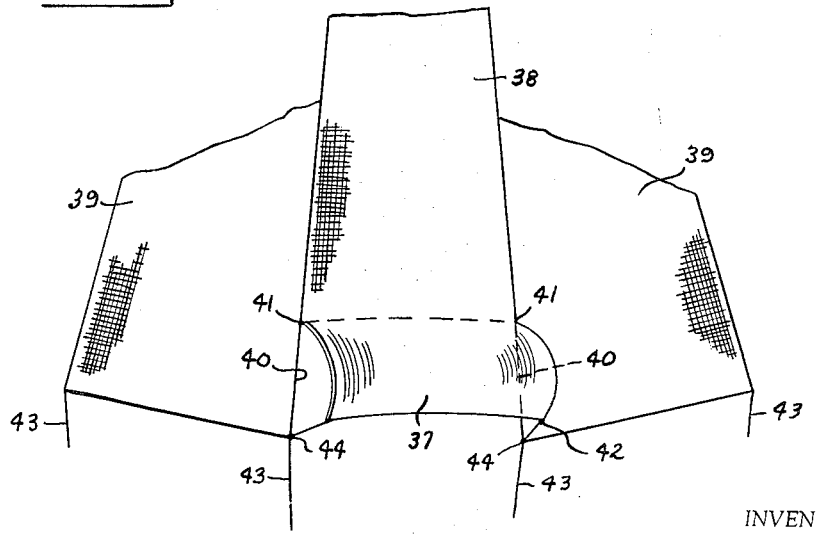
FIG. 6 is a diagrammatic view of a single panel or gore in which an outwardly deflectable flap portion is formed at the outer end which is tied to the shroud lines on both sides thereof to increase the rate of deployment of the chute in the slip stream.

In FIG. 6 flaps 37 are provided at the outer ends of panels 38 between alternate spaced solid panels or segments 39. These flaps 37 are rectangular and not inclined for producing rotation of the canopy. The lower or outer ends of the panels 38 are not connected directly to the edges 40 from the points 41 to the lower edge of the skirt, thus forming the rectangular flaps 37. The opposite lower corners 42 of the flaps 37 are tied to the lower ends of the adjacent panels 39, or to the shroud lines 43 at 44 to limit the outward deflection of the flaps.

When the chute is deployed the slip stream air entering and deflecting the flaps 37 outwardly provides means for accelerating the rate of full deployment of the canopy.

Figure 7:
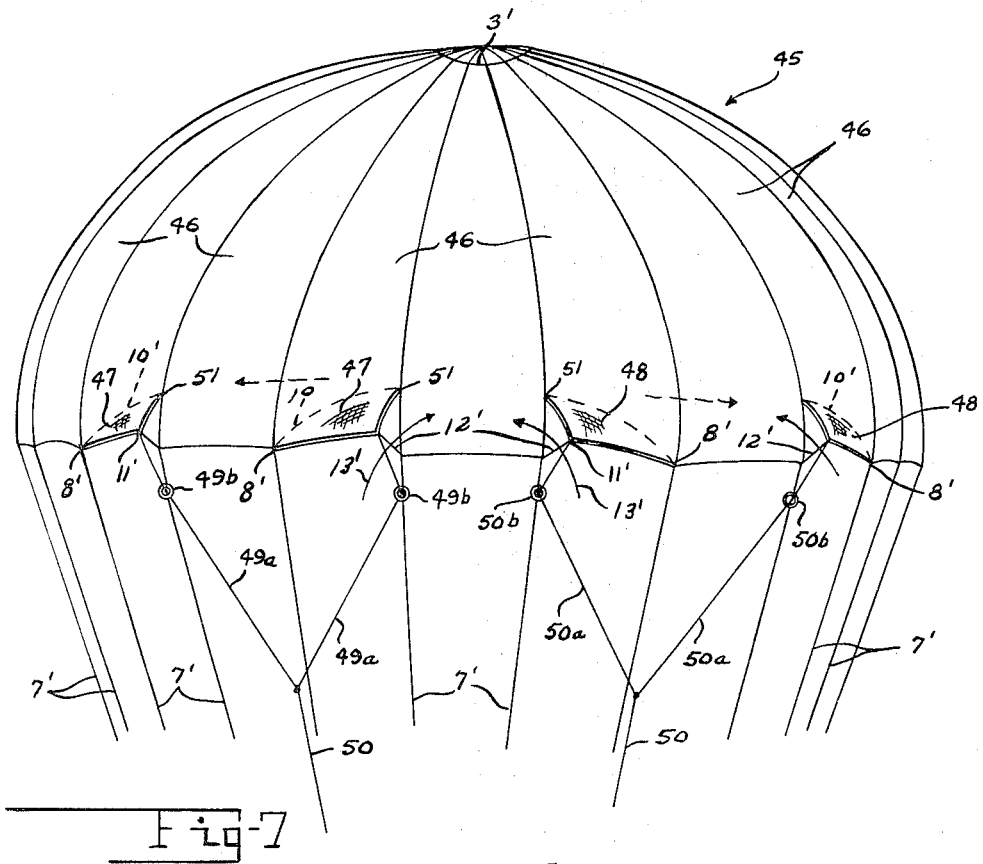
FIG. 7 is a further modification illustrating a construction and means for selective controlled rotation of the canopy in either direction during descent.

In FIG. 7 the canopy shown and indicated at 45 is of the flat circular type, comprising radial segments or panels 46, alternate panels thereof being provided with inclined triangular rotation inducing flaps or rota-vanes 47 and 48 fabricated in the lower ends of the panels in the manner described in connection with FIGS. 1 and 2, except that they are disposed in or at the outer ends of alternate panels, and certain of the flaps 47—47 are inclined in the opposite direction from the flaps 48. The reference numerals used in connection with FIG. 1, except primed, are employed in this figure to denote the similar parts as described in connection with FIG. 1. Therefore, the additional or repeated description of these details of construction is not thought necessary.

However, it should be noted that normally the air deflection vanes oppose each other and no rotation of the canopy is effected although the outwardly deflected vanes 47 and 48 assist in the more rapid expansion of the canopy 45 during deployment.

Means, however, are provided for producing selective rotation of the canopy in either direction which comprise control or pull cables 49 and 50 each having branch lines 49a and 50a passing through rings or pulleys 49b and 50b to the tips or apexes of the triangular flaps 47 and 48. The cables 49a connecting flaps 47 which are inclined in one direction, while the cables 50a connect the apexes of the flaps 48 which are inclined in the opposite direction.

Pulling downward on the cable 49 collapses the flaps 47 facing in one direction to allow the air passing under the other flaps 48 to rotate the canopy in one direction, while pulling the other cable 50 collapses the air deflection vanes 48 to cause rotation of the canopy about its axis in the opposite direction.

If the flaps 47 and 48 are only disposed on one side of the canopy then the air deflected by both sets of the flaps will produce some forward propulsion while proper manipulation of the cables 49 and 50 provides some directional steering, and when both of the cables 49 and 50 are pulled downwardly to collapse both sets of vanes 47 and 48, this causes the arrest or retardation of the forward movement of the canopy during its descent.

Figure 8:
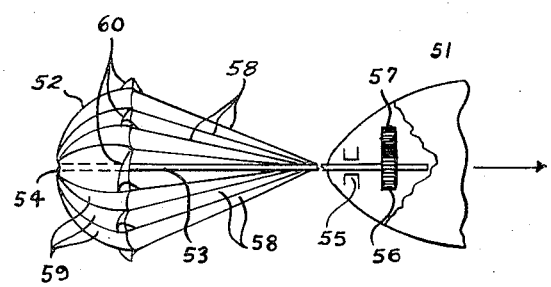

FIGS. 8 and 9 illustrate examples of the use of the rotational or rota-vane parachute in connection with missiles or space vehicles for generating power, during and prior to recovery. In FIG. 8 the reference numeral 51 denotes the rear end of a space vehicle or missile, while 52 indicates the rota-vane parachute which is mounted on a supporting rod 53, the center of the canopy 52 being fixed to the rod 53 by a disc which is fixed on the forward end of the rod 53. The rod 53 extends into the vehicle 51 through suitable ball bearings 55 and carries a drive gear 56 which drives a second smaller gear 57 that may be used to generate power, such as driving an electrical generator (not shown). Suitable shroud lines 58 connect the skirt of the canopy 52, the panels 59, or a certain number thereof being provided with the inclined rota-vanes or inclined flaps 60 for effecting rotation. Any suitable means may be provided for holding the canopy compacted around the rod 53 which is releasable when desired to allow the canopy to expand and cause rotation of the drive gear 56, when the space vehicle passes into sufficient atmosphere for rotation of the canopy. The construction of the rota-vanes or flaps 60 may be the same as shown in FIGS. 1 and 2 and, therefore, a detailed description thereof is not thought to be necessary in connection with the showing in FIG. 8 or in connection with FIG. 9.

The material used in the construction of the canopy 59 and associated parts, as shown in FIGS. 8 and 9, must necessarily be made of high heat resistant materials, several conventional materials being known and available at this time.

In FIG. 8 the rotational chute 52 is located at the rear of the space vehicle while in FIG. 9 the rotational chute, indicated at 52a and located on a support 53a in front or projecting forwardly of the vehicle 51a, the rod or shaft 53a being suitably journalled drives a gear 56a which in turn drives a suitable gear train for delivering power, for instance to an electrical generator or other means (not shown).

The canopy is composed, like in the other preferred forms, of panels or gores 59a having the rota-vanes constructed in accordance with FIGS. 1 and 2 and the provision of shroud lines 58a between the panels and the forward end 53b of the supporting shaft 53a.

The dotted lines 61 indicate a slightly different arrangement, foreshortening the forward extension of the rotational canopy device in front of the space vehicle 51a, in which the brace members 61 may be rigid or extensible to spread the canopy into the air stream for rotation thereof. The numeral 62 denotes the direction of travel of the space vehicle.

For purposes of exemplification of the invention several embodiments have been shown and described to the best understanding thereof. However, it will be apparent that changes and modifications in the arrangement and construction of the parts may be resorted to without departing from the true spirit and scope of the invention as defined in the accompanying claim.

I claim:

An auto-rotating parachute comprising a plurality of circumferentially spaced segmental gores connected along their radial edges to form a flat circular canopy, one and the same sides of predetermined circumferentially spaced gores being separate from its adjacent gore from the outer edge of the skirt portion inwardly for a predetermined distance, shroud lines connected to one and the same side only of the outer end of each of said gores to leave the ends of the opposite sides of said gores free, relative to direct connection with the shroud lines to form triangular air deflecting flap members at the outer ends of the gores, and flexible connecting members connected between the free ends of said triangular flap members and said shroud lines adjacent the junctures of said shroud lines with said gores having predetermined lengths for limiting outward deflection of said triangular flaps by the air stream entering the canopy during deployment and descent of said canopy in which certain of the triangular flap members are disposed with their free ends facing circumferentially of the canopy in the opposite direction from the other flap members, and means connected to the free ends of said triangular flap members for selectively drawing the free ends of the flap members toward the shroud lines to draw said flaps into inoperative positions substantially coincident with the outer surface of the gores to eliminate the deflection of the air stream by said triangular flap members during descent of the parachute.

References Cited by the Examiner

UNITED STATES PATENTS

| 1,951,864 | 3/1934 | Driggs | 244—142 |
| 2,703,212 | 3/1955 | Heinrich | 244—152 |

FOREIGN PATENTS

| 1,092,383 | 11/1954 | France. |
| 1,174,640 | 11/1958 | France. |
| 144,792 | 6/1920 | Great Britain. |
| 162,029 | 8/1933 | Switzerland. |

MILTON BUCHLER, *Primary Examiner.*

ALFRED E. CORRIGAN, *Examiner.*